(12) United States Patent
Frenier

(10) Patent No.: US 6,911,418 B2
(45) Date of Patent: Jun. 28, 2005

(54) METHOD FOR TREATING A SUBTERRANEAN FORMATION

(75) Inventor: Wayne Frenier, Katy, TX (US)

(73) Assignee: Schlumberger Technology Corporation, Sugar Land, TX (US)

( * ) Notice: Subject to any disclaimer, the term of this patent is extended or adjusted under 35 U.S.C. 154(b) by 302 days.

(21) Appl. No.: 10/142,309

(22) Filed: May 9, 2002

(65) Prior Publication Data

US 2002/0170715 A1 Nov. 21, 2002

Related U.S. Application Data

(60) Provisional application No. 60/291,771, filed on May 17, 2001.

(51) Int. Cl.[7] ............................. C09K 3/00; E21B 43/16
(52) U.S. Cl. ........................ 507/241; 166/307; 166/312
(58) Field of Search ......................... 507/241; 166/300, 166/307, 312

(56) References Cited

U.S. PATENT DOCUMENTS

| | | | | |
|---|---|---|---|---|
| 4,036,300 A | * | 7/1977 | Holm et al. ............. | 166/270.1 |
| 4,090,563 A | | 5/1978 | Lybarger et al. ............. | 166/307 |
| 4,359,093 A | * | 11/1982 | Bernard ...................... | 166/400 |
| 5,979,556 A | | 11/1999 | Gallup et al. ............... | 166/275 |
| 6,140,277 A | * | 10/2000 | Tibbles et al. .............. | 507/201 |
| 6,263,967 B1 | * | 7/2001 | Morris et al. ............... | 166/312 |

FOREIGN PATENT DOCUMENTS

| GB | 2338254 | 12/1999 |
|---|---|---|
| WO | WO 99/27225 | 6/1999 |
| WO | 01/83639 | 11/2001 |

OTHER PUBLICATIONS

The Influence of Transport and Reaction on Wormhole Formation in Carbonate Porous Media: A Study of Alternative Stimulation Fluids By Christopher N. Fredd (University of Michigan, 1998).

The Influence of Chelating Agents on the Kinetics of Calcite Dissolution: J. Coll. & Interface. Sci. 204, 187–197 (1998); By Fred C.N., and Fogler, H.S.

Alternative Stimulation Fluids and their Impact on Carbonate Acidizing, SPE 31074 (1996); by Fredd, C.N. and Fogler, H.S.

Chelating Agents as Effective Matrix Stimulation Fluids for Carbonate Formations, SPE 37212 (1997) by C.N.Fredd and H.S.Fogler.

The Existence of an Optimum Damköhler Number for Matrix Stimulation of Carbonate Formations, SPE 38167 (1997) C.N.Fredd, R.Tjia, and H.S.Fogler.

* cited by examiner

Primary Examiner—Philip C. Tucker
(74) Attorney, Agent, or Firm—Thomas O. Mitchell; Robin Nava; Brigitte L. Echols

(57) ABSTRACT

A method for increasing the permeability of a subterranean formation is disclosed in which an amount of an aqueous mixture, sufficient to increase the permeability of the formation, comprising specified aminopolycarboxylic anionic species, and specified cationic species, is injected into the formation matrix.

23 Claims, 2 Drawing Sheets

Core Flood, 66 °C, Indiana Limestone

METHOD FOR TREATING A SUBTERRANEAN FORMATION

REFERENCE TO RELATED PROVISIONAL APPLICATION

This application claims the benefit of U.S. Provisional Application Ser. No. 60/291,771 filed May 17, 2001.

FIELD OF THE INVENTION

The invention relates to a method for treating a subterranean formation to increase its permeability. More particularly, the invention relates to a stimulation method for application in subterranean formations comprising or containing carbonate.

BACKGROUND OF THE INVENTION

Fluid hydrocarbons, such as petroleum, natural gas, and other hydrocarbons, may be obtained from a subterranean geologic formation or strata by drilling a borehole or wellbore that penetrates the formation. While the wellbore provides a partial flowpath for the hydrocarbons to the surface, it will be recognized that, for the hydrocarbons in the formation to be produced in paying quantities, the hydrocarbons initially must flow substantially unimpeded in the formation to the wellbore. Absent damage to the formation during drilling or well completion operations, the rate of flow of the hydrocarbons to the wellbore will be determined in large measure by the permeability of the matter, i.e., rock, comprising the formation.

For a variety of reasons, formation permeability, at least in some segments or areas of the formation, may be insufficient to provide the flow desired. For example, as indicated, drilling fluids and other fluids employed during drilling or development operations may penetrate the formation and cause plugging of the pores of the rock comprising the formation. In addition, during production, fine particles migrating with hydrocarbons through the formation may cause plugging of some formation pores. Finally, some formations are comprised of rock having few and/or very small pores, so that the rate of hydrocarbon flow, even under the best of circumstances, is slow.

To provide or insure an acceptable rate of flow of the hydrocarbons to the wellbore, various formation treatment procedures, referred to collectively as well stimulation, have been developed. For example, "fracturing" and "acidizing" are common oilfield stimulation techniques, the first-mentioned technique involving operations directed to providing an actual cleft or fracture in the rock through which the hydrocarbons may flow, while "acidizing" involves injection of acid(s), e.g., mineral acids, into the formation for reacting with components in the rock and/or for cleaning the pores. However, as is well recognized, fracturing can damage a formation, and use of acids presents its own set of problems, such as, in the case of strong acids, limited radial penetration of the rock in some instances because of rapid reaction and spending of the strong acid(s). Accordingly, procedures have been developed which provide for injection of different types of reactants (e.g., weaker acids, such as formic acid or acetic acid) into the formation to react with the rock and/or plugging materials and improve permeability at locations distant from the wellbore.

In a doctoral dissertation titled "THE INFLUENCE OF TRANSPORT AND REACTION ON WORMHOLE FORMATION IN CARBONATE POROUS MEDIA: A STUDY OF ALTERNATIVE STIMULATION FLUIDS" (University of Michigan, 1998), C. N. Fredd proposes the use of relatively low concentration solutions prepared by dissolution of specified reagents in water as possible reactants for stimulating calcium carbonate-containing formations. In particular, an aqueous solution prepared with disodium salt dihydrate of ethylenediamine-tetraacetic acid, and similarly prepared solutions of 1,2 cyclohexanediamine tetraacetic acid (CDTA) and diethylene triaminepentaacetic acid (DTPA) were tested in laboratory experiments to determine possible "wormhole" formation in calcium carbonate cores. However, as acknowledged in the dissertation, the effects or results of higher concentrations of the reactants in the solutions, as would be used in field operations, were unknown. All the experiments were done at solution concentrations of about 0.25 molar; for perspective that would be about 8.5 weight percent of disodium EDTA. Moreover, all of the experiments were conducted at relatively low temperatures, which are significantly below many deep well temperatures.

Because all conventional procedures for well stimulation have their own limitations, there exists a continuing need in the oilfield industry for improved methods and techniques for treating subterranean formations to improve permeability. For example, as mentioned, the Fredd dissertation acknowledges that the results of utilizing higher concentrations of the reactants employed in the experiments reported, as would be desired in actual field operations, were unknown. Thus, the suggestion by Fredd of the use of relatively low concentration solutions prepared from disodium dihydrate ethylenediamine-tetraacetate appears somewhat limited, in that the concentrations employed in the Fredd experiments appear to be close to the maximum solubility of the composition at lower pH levels. Accordingly, the invention described hereinafter addresses this continuing need for effective and improved formation stimulation, and provides an improved method for stimulating subterranean geologic formations.

SUMMARY OF THE INVENTION

In one embodiment, therefore, the invention is directed to an improved method for treating a subterranean formation in which an aqueous mixture containing specified reactant materials or components in appropriate concentrations is injected into the formation matrix in an amount sufficient to increase the permeability of the formation. More particularly, the invention relates to a method of treating a subterranean formation to increase permeability comprising injecting into the formation matrix an amount of an aqueous mixture, sufficient to increase the permeability of the formation, the mixture comprising, as described more fully hereinafter, aqueous liquid containing specified aminopolycarboxylic anionic species, and specified cationic species. In a preferred form, the aqueous mixture is formed by blending an aqueous liquid and an effective amount of an ammonium or potassium salt composition of an aminopolycarboxylic acid selected from ethylenediamine tetraacetic acid, diethylenetriamine pentaacetic acid, and mixtures thereof. In its most preferred form, the invention relates to a method of treating a subterranean formation to increase permeability comprising injecting into the formation matrix an amount of an aqueous mixture, sufficient to increase the permeability of the formation, the mixture being formed by blending an aqueous liquid and an effective amount of an ammonium or potassium salt composition of ethylenediamine tetraacetic acid. In another embodiment, the invention relates to a method of treating a subterranean formation to increase permeability involving selecting the optimal aminopolycarboxylic acid salt, pH and pumping rate to minimize the volume required to create wormholes. In yet another embodiment, the invention relates to a method of treating a subterranean formation to increase permeability involving selecting the optimal aminopolycarboxylic acid salt and pH to minimize the pumping rate required to create wormholes.

DETAILED DESCRIPTION OF THE INVENTION

Figure 1:
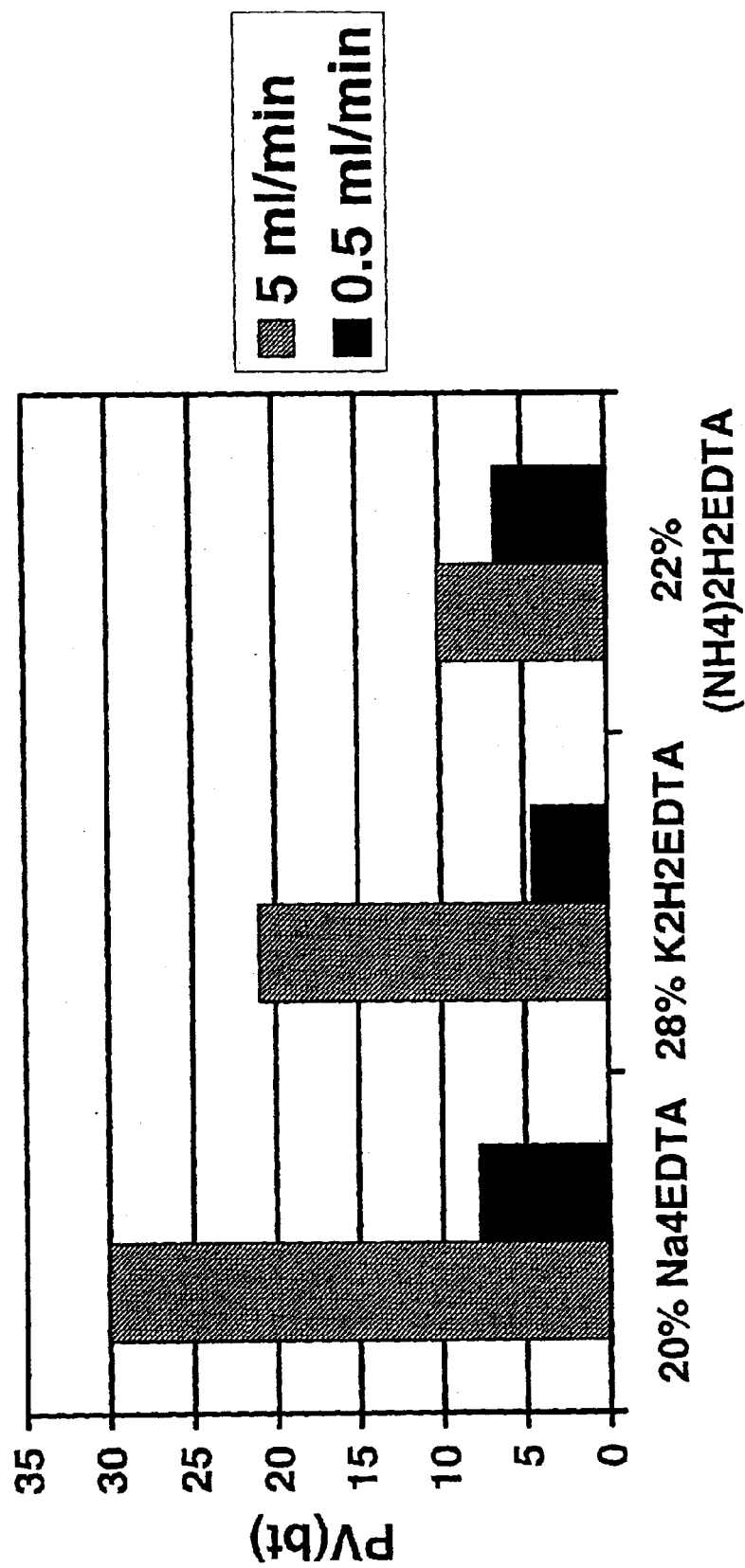
FIG. 1 is a graph illustrating results of core-flooding tests of Indiana limestone with specified aqueous mixtures at 66° C.

As employed herein, the terms "treating" or "treatment" refer primarily to main formation or matrix stimulating procedures, although other formation stimulation procedures, such as preflush, are not excluded. Accordingly, in one formation treatment embodiment of the invention, the aqueous mixture (described more fully hereinafter) employed in the invention will be injected into the formation, at a pressure or pressures commonly described as matrix pressure, in an amount or volume sufficient or effective to increase the permeability of the formation at a location distant significantly greater from the wellbore than the near-wellbore area, i.e., beyond the area invaded by drilling or completion fluids, in what is usually referred to as the formation matrix. Stated differently, the volume of aqueous mixture of the invention injected, the concentrations of reactive components therein, and matrix pressure, are correlated to stimulate a subterranean formation matrix. Alternatively, if desired, the injection treatment may be applied at or above fracture pressure.

As will be evident from the foregoing Summary of the invention, the invention relies on the utilization of aqueous mixtures containing specified aminopolycarboxylic anionic species and specified cationic species. In particular, the method of the invention employs aqueous mixtures containing aminopolyearboxylic anionic species selected from EDTA anion, DTPA anion, or mixtures thereof, and cationic species selected from potassium ion, ammonium ion, and mixtures thereof, in a ratio of said cationic species to the selected aminopolycarboxylic anionic species of at least one. As employed herein, the expression "EDTA anion" includes the tri-, di-, and mono-protonated forms or species of the ethylenediamine tetraacetate anion, as well as the fully dissociated form, while, similarly, the expression "DTPA anion" includes the tetra-, tri-, di-, and mono-protonated forms of the diethylene pentaacetate anion, as well as the fully dissociated form, the particular form or forms and their amounts present in a given mixture being dependent on the manner of formation of the mixture and its pH. Correspondingly, the ratio of the cationic species to the selected aminopolycarboxylic species may range up to 4 or more, in the case of EDTA anion, as deprotonation increases, and up to 5 or more in the case of DTPA anion. As will readily be understood by those skilled in the art, blending of the components, compounds, or solutions mentioned hereinafter with aqueous liquid gives rise to dissolution or dissociation of the components, etc., or chemical reactions in the aqueous liquid, to the effect that, depending on pH, and the original components blended, one or more of the anionic species or forms present in such components, etc., will be present in the aqueous liquid. For example, at a pH of 6, an aqueous mixture prepared from water and dipotassium ethylenediamine tetraacetate may contain about 50 percent of the ethylenediamine tetraacetate anion as the monoprotonated species, and about 50 percent as the diprotonated species. As will be recognized by those skilled in the art, the aqueous mixture or liquid employed in the method of the invention may contain other non-interfering anionic and cationic species, e.g., from various additives, inhibitors, etc., in minor or major amounts, as is common in formation treatment procedures. As utilized herein, the term "non-interfering" simply indicates that the component does not inhibit to a significant degree the function of the active compositions or ingredients employed in the method of the invention, it being recognized, for example, that, as discussed more fully hereinafter, appropriate acids or bases may be added for pH control with intended desired effects.

The ionic species present in the aqueous mixtures employed in the method of the invention may be supplied in the mixture in any suitable manner. For example, aqueous liquids may be blended with required amounts of an ammonium or potassium salt composition of an aminopolycarboxylic acid selected from ethylenediamine tetraacetic acid, diethylenetriamine pentaacetic acid, and mixtures thereof. As employed herein, the expression "ammonium or potassium salt composition of an aminopolycarboxylic acid selected from ethylenediamine tetraacetic acid, diethylenetriamine pentaacetic acid, and mixtures thereof" refers to compositions which yield the desired ammonium or potassium cations, and the specified aminopolycarboxylic acid anionic species, in aqueous liquid. For example, dipotassium ethylenediamine tetraacetate or diammonium ethylenediamine tetraacetate, or mixtures thereof, may be blended with an aqueous liquid in the required amounts, or an aqueous solution prepared by blending such compound(s) with water or aqueous liquid may be prepared, and blended or diluted further with aqueous liquid to provide the compositions used in the invention. At least some of such salt compositions are available as hydrates, and these may be employed to provide the ionic species. Again, aqueous liquids according to the invention may be prepared by reacting ethylenediamine tetraacetic acid or diethylenetriamine pentaacetic acid with an appropriate amount of a suitable potassium or ammonium, or mixture thereof-containing compound(s), preferably in aqueous liquid, followed, if desired, by blending with additional aqueous liquid in the desired proportions.

As indicated, mixtures employed according to the invention comprise the required active component(s) in an aqueous liquid. The expression "aqueous liquid" is understood as including a wide spectrum of water-based liquids, including, but not limited to, fresh water, seawater, dilute acids, and brines, so long as any components of the aqueous liquid do not interfere significantly with the formation of or performance of the compositions used in the invention. The suitability of an aqueous liquid for use in formulating the compositions employed in the invention may be determined by routine testing.

Within the limits of practical operation, the concentrations of the stimulating ionic species employed in the invention are not critical. However, as indicated, it is a key advantage of the invention that greater concentrations of stimulating composition may be applied in the stimulation process. That is, the greater solubilities of potassium ethylenediamine tetraacetate and potassium diethylenetriamine pentaacetate in aqueous liquid, particularly at low pH, allows stimulation or attack of the formation with solutions having greater reactive and chelating capacity. Moreover, in the case of ammonium ethylenediamine tetraacetate, or that of ammonium diethylenetriamine pentaacetate, not only are their good solubilities of similar great advantage, but these ammonium salts have a "stored" acid function that increases their capacity for stimulation. Accordingly, as will be understood by those skilled in the art, concentrations of the components or reactants may be varied considerably, so long as the aqueous mixture contains an amount or concentration of the EDTA anion, DTPA anion, etc., which, when injected in sufficient volume or amount into the subterranean formation, is effective to increase the permeability of a subterranean formation.

Preferably, treatment mixtures of the method of the invention will contain from about 5 weight percent or less up to about 50 weight percent of the anionic species chosen. More preferably, the treatment mixture comprises from about 5 to about 20 weight percent of the anion. Unless otherwise specified, or evident from context, all component percentages of mixtures expressed hereinafter are by weight, based on the total weight of the component specified and the rest of the mixture.

As indicated, most of the aqueous treatment compositions employed in the invention treatment may be formulated simply by blending the chosen composition, or mixture of such compositions, or hydrates or solutions of such composition(s), with aqueous liquid with agitation, and perhaps heat, if desired. In general, the aminopolycarboxylic components used in formulating the mixtures used in the invention are known and may be obtained from commercial chemical sources, or they may be prepared by well-known procedures. Commercial grade components may be utilized, of standard strengths available, so long as any extraneous species present therewith or therein do not interfere significantly with the formulation of or function of the mixtures employed in the invention. Where addition of an acid or base is employed for control of pH of an aqueous mixture employed in the invention, the sequence of blending the components of the aqueous mixture of the invention is not critical, i.e., the components mentioned may be blended in any desired order or sequence. Preferably, however, the active treatment composition is blended first with the aqueous liquid, followed by the blending or addition of the acid or base. For example, a desired weight of dipotassium ethylenediamine tetraacetic acid may be mixed with fresh water in a mixing vessel, followed by addition of hydrochloric acid if a low pH is desired. A similar procedure may be followed where base is provided. Thus, the pH of a solution of ammonium diethylenetriamine pentaacetate may be increased by addition of ammonium and/or potassium hydroxide. Additionally, where mixtures of the active components or solutions thereof are provided, they may also be blended in any desired order or sequence, and, if acid or base addition thereto is desired for pH control, the blending of the acid or base may be in any desired sequence.

The pH of the aqueous treatment mixtures employed in the invention may be varied widely. Accordingly, pH may range from about 4 to about 12, a preferred range being about 4 to about 9.5, a most preferred range being about 4 to about 6. As indicated, addition of a suitable non-interfering acid, e.g., HCl, or organic acids such as formic acid, acetic acid, and malic acid, may be employed to provide lower pH of the mixtures, while non-interfering bases, such as potassium and ammonium hydroxide, may be utilized to raise pH, the amount of acid or base added, of course, being that sufficient to raise or lower the pH to the desired level. In general, low pH is considered to aid in maintaining calcium and magnesium species in solution. The solubility equilibria are such that about 40 percent by weight of sodium salts of EDTA will be dissolved in an aqueous mixture at a pH of about 12, whereas only about 10 percent will be dissolved at a pH of about 4. However, 40 percent by weight of potassium salts of EDTA will be dissolved in an aqueous mixture at a pH of about 12, whereas about 28 percent will be dissolved at a pH of about 4. Finally, about 42 percent by weight of ammonium salts of EDTA will be dissolved in an aqueous mixture at a pH of only about 9.5, and about 40 percent will still be dissolved even at a pH of about 4. Clearly, then, the potassium and ammonium salts could be used at higher concentrations at lower pH's. To use sodium EDTA, more and more fluid would be required to deliver the same dissolving capacity at lower and lower pH's.

Although the mixtures employed in the invention may be blended offsite, they also may be blended at the surface proximate the well site, or on the fly, and pumped downwell to the formation selected for treatment, which will commonly be isolated by suitable means, as is known in the art. Alternatively, the mixtures employed in the invention may be blended offsite as concentrates, and then diluted at the well site, either in advance, or on the fly. The mixtures employed in the present invention may be pumped at desirably low rates (e.g., 1–5 BPM), and because they may be formulated at high concentrations, the overall volume of the treatment fluid may be reduced.

The method of the invention is particularly suited for stimulating carbonate formations, such as calcite or dolomite formations, but may also be utilized in other formations in which carbonate particles migration is significant. The invention may be used at well temperatures ranging from about 13° C. to about 205° C., most preferably in wells at temperatures ranging from 66° C. to about 205° C. Although the methods are described here and most typically used for hydrocarbon production, they may also be used in injection wells and for production of other fluids such as water or brine, carbon dioxide, or helium.

In a typical treatment, one or more preflushes, utilizing a preflush fluid such as toluene, xylene, or the like, may be employed, if desired, to clean the wellbore and surrounding formation of organic deposits, such as paraffins or asphaltenes. When any desired preflushes have been completed, a suitable or sufficient volume of an aqueous mixture according to the invention, e.g., a 20 percent solution of diammonium-dihydrogen EDTA including a suitable corrosion inhibitor, is injected or pumped into the formation matrix in a conventional manner as the main stimulating composition, preferably at a matrix rate, i.e., at a rate which does not fracture the formation.

As evident from the foregoing, the concentrations of the stimulating composition blended with or formed in the aqueous liquid employed will be those effective to achieve an observable improvement in permeability. Such an effect may be recognized, for example, by improved production over a more prolonged period of time than would have been predicted based on previous experience in a given formation, or, for example, by laboratory techniques, such as coreflow tests, or by examination of a formation sample using a scanning electron microscope, as discussed in Society of Petroleum Engineers Paper No. 6007.

The differing solubilities and reactivities of the different aminopolycarboxylic acid salts, and the concomitant ability to adjust pH's and concentrations, affords operators conducting formation stimulations a new way to optimize performance and simultaneously reduce expenses by adjusting both the pump rates and the volumes used. All five factors (choice of fluid, pH, concentration, volume and pump rate) may be adjusted in combination or independently. Usually the choice will be to use the lowest possible pH, volume, and pump rate, but, as non-limiting examples, the availability of equipment or chemicals, or high fluid loss rates, might dictate otherwise. In particular, the methods described herein, using certain ammonium and potassium aminopolycarboxylic acid salts, allow the operator to match the pump rate with the reactivity to achieve optimal use of the fluids to create wormholes.

The following experiments were conducted.

Experiment I.

Dynamic coreflood tests were conducted using conventional coreflood test equipment (Larson Engineering) comprising a core holder with Hassler sleeve (approximately one inch in diameter by six inches in length). The methodology followed was analogous to that described in the aforementioned Fredd dissertation; by Fredd, C. N., and Fogler, H. S., "The Influence of Chelating Agents on the Kinetics of Calcite Dissolution", J. Coll. & Interface. Sci. 204, 187–197 (1998); by Fredd, C. N., and Fogler, H. S., "Alternative Stimulation Fluids and their Impact Carbonate Acidizing", SPE 31074 (1996); by Fredd, C. N., and Fogler, H. S., "Chelating Agents as Effective Matrix Stimulation Fluids for Carbonates", SPE 37212 (1997); and by Fred C. N., et al, "The Existence of an Optimum Damköhler Number for Matrix Stimulation of Carbonate Formations", SPE 38167 (1997).

In each test, a limestone core (core length 14.0 to 15.4 cm, pore volume 9.6 to 11.4 ml, initial permeability 27 to 77 mD) was loaded into the core holder of the unit. Three aqueous mixtures were prepared: a 20 percent solution of tetrasodium ethylenediamine tetraacetate, a 28 percent solution of dipotassium ethylenediamine tetraacetate, and a 22 percent solution of diammonium ethylenediamine tetraacetate.

In one set of runs, the cores were flooded with the aqueous mixtures at a rate of 0.5 ml/min, and, in a second set of runs, at a higher rate of 5.0 ml/min., in each case the temperature of each core being maintained at 66° C. The pore volume to breakthrough (PVbt) was estimated from the onset of the flat portion of a permeability/time curve derived from permeability calculations.

Results of the tests are shown in the graph of FIG. 1. As clearly illustrated, at the higher injection rate (5.0 ml/min), the pore volumes required for breakthrough by mixtures according to the invention were unexpectedly substantially lower than the pore volume required for breakthrough of sodium EDTA. In particular, while the (PVbt) of the 20 percent solution of tetrasodium ethylenediamine tetraacetate was about 30, the (PVbt) of the 28 percent solution of dipotassium ethylenediamine tetraacetate was about 22, and the (PVbt) of 22 percent solution of diammonium ethylenediamine tetraacetate was about 10.

Experiment II.

Figure 2:
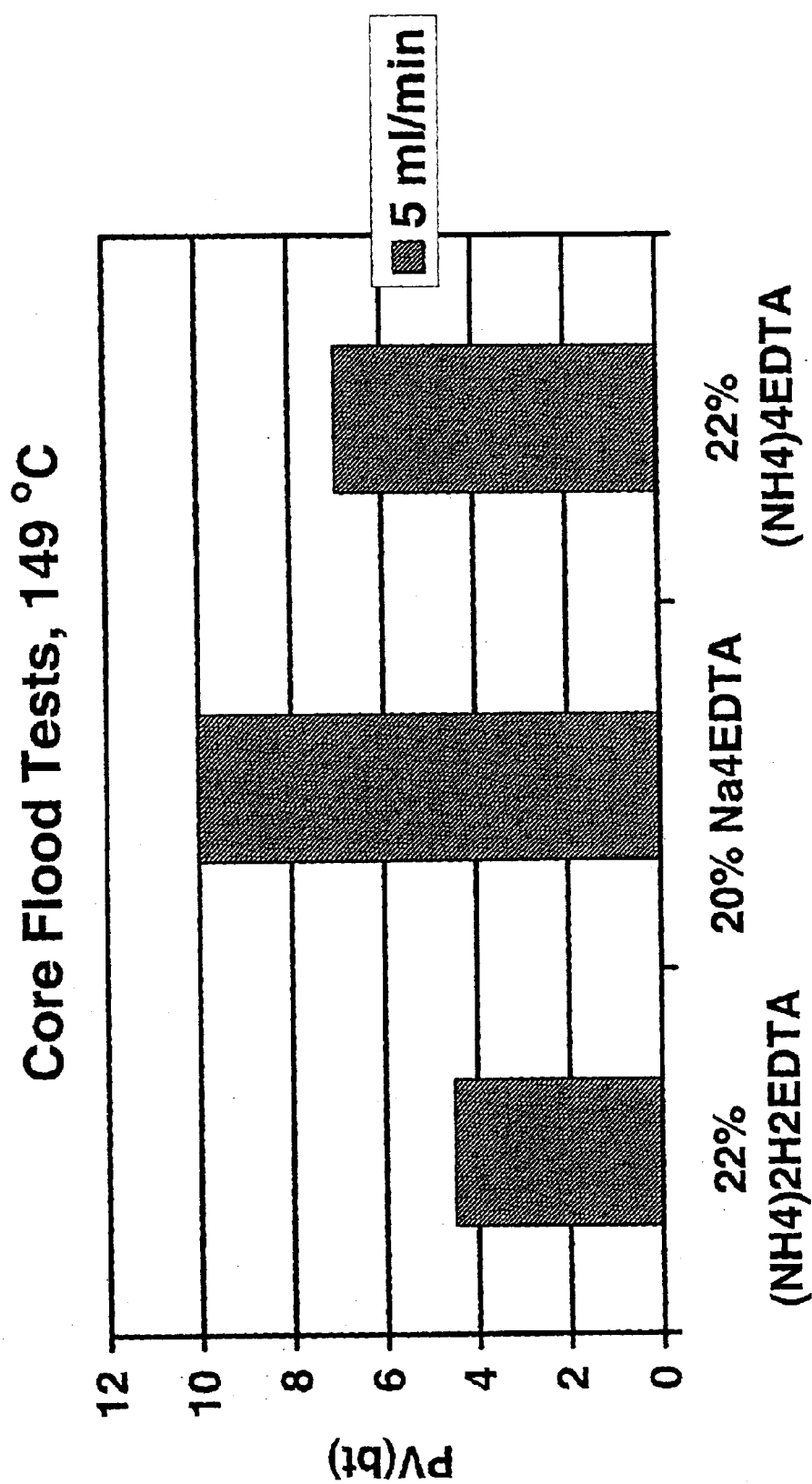
FIG. 2 is a graph illustrating results of core-flooding tests of Indiana limestone with specified aqueous mixtures at 149° C.

A 20 percent solution of tetrasodium ethylenediamine tetraacetate, a 22 percent solution of diammonium ethylenediamine tetraacetate, and a 22 percent solution of tetraammonium ethylenediamine tetraacetate were provided. The procedure followed in the previously described set of tests was repeated, but at a temperature of 149° C., and at a single flow rate of aqueous mixture of 5 ml per minute. The results of these tests are illustrated in the graph of FIG. 2, which clearly demonstrate a lower $PV_{bt}$ for each ammonium ethylenediamine tetraacetate solution, particularly the diammonium ethylenediamine tetraacetate solution.

Experiment III.

Three aqueous mixtures or solutions were provided: a 20 percent mixture of tetrasodium ethylenediamine tetraacetate (which resulted in a pH of about 12), a 28 percent solution of dipotassium ethylenediamine tetraacetate (which resulted in a pH of about 4.5 to 5), and a 21 percent mixture of diammonium ethylenediamine tetraacetate (which resulted in a pH of about 4.5 to 5). Calcium carbonate was stirred into each mixture until saturation was achieved. The amount of calcium carbonate dissolution was then determined by inductively coupled plasma. On the basis of lbs./1000 gal. dissolved $CaCO_3$, the 20 percent tetrasodium ethylenediamine tetraacetate mixture dissolved 520 lbs., the 28 percent mixture of dipotassium ethylenediamine tetraacetate dissolved 738 lbs., and the 22 percent mixture of diammonium ethylenediamine tetraacetate dissolved 735 lbs. Accordingly, the dipotassium ethylenediamine tetraacetate and diammonium ethylenediamine tetraacetate solutions were dramatically superior in dissolving the calcium carbonate. A given amount of the potassium salt, relative to the same amount of the sodium salt, dissolved about the same amount of calcium carbonate but at a lower pH and in a more concentrated solution than would have been possible with the sodium salt at that pH. A given amount of the ammonium salt dissolved much more calcium carbonate than about the same amount of the sodium salt at about the same concentration, and again did so at a much lower pH.

Although no experiments have been performed, it is believed that lithium salts of ethylenediamine tetraacetic acid, diethylenetriamine pentaacetic acid, and mixtures thereof (or mixtures of one or more of these salts with one or more of the ammonium or potassium salts of ethylenediamine tetraacetic acid or diethylenetriamine pentaacetic acid) would be effective for treating a subterranean formation to increase its permeability.

In International Patent Application No. WO9927225, which had a common assignee as the present application, methods for improving placement of cement slurries in wells in the presence of geological zones containing swelling clays or mud residues containing clays were given. The methods included treating with a solution containing clay precipitating agents so as to coagulate the clay prior to the cement slurry being put into place during the cementing stage. The clay precipitating agents included quaternary ammonium, potassium, and cesium salts to convert the sodium form of the clays into the corresponding ammonium, potassium, and cesium forms. Although no experiments have been conducted, it is believed that the ammonium, lithium and potassium salts of the present invention would coagulate clays for this purpose.

What is claimed is:

1. A method of treating a subterranean carbonate formation to increase permeability comprising injecting into the carbonate formation matrix an amount of an aqueous mixture, sufficient to increase the permeability, of a region of the formation not invaded by drilling or completion fluid, by dissolving formation carbonate, the aqueous mixture comprising an aqueous liquid containing an effective amount of aminopolycarboxylic anionic species selected from EDTA anion, DTPA anion, and mixtures thereof, and cationic species selected from potassium ion, lithium ion, ammonium ion, and mixtures thereof, in a ratio of said cationic species to said aminopolycarboxylic anionic species of at least 1.

2. The method of claim 1 wherein the aminopolycarboxylic anionic species is the EDTA anion.

3. The method of claim 2 wherein the cationic species is the potassium ion.

4. The method of claim 2 wherein the cationic species is the ammonium ion.

5. The method of claim 2 wherein the cationic species is the lithium ion.

6. The method of claim 1 wherein the aqueous mixture is formed by blending an aqueous liquid and an ammonium, lithium, or potassium salt composition of an aminopolycarboxylic acid selected from ethylenediamine tetraacetic acid, diethylenetriamine pentaacetic acid, and mixtures thereof.

7. The method of claim 6 in which at least a portion of the ammonium, lithium, or potassium salt composition is supplied to the aqueous liquid as an aqueous solution prepared by blending such composition with aqueous liquid.

8. The method of claim 6 wherein at least a portion of the ammonium, lithium, or potassium salt composition is supplied as a hydrate or hydrates.

9. The method of claim 6 in which the ammonium, lithium, or potassium salt composition is selected from potassium ethylenediamine tetraacetate or a hydrate or hydrates thereof.

10. The method of claim 6 in which the ammonium, lithium, or potassium salt composition is selected from ammonium ethylenediamine tetraacetate or a hydrate or hydrates thereof.

11. The method of claim 6 in which the ammonium, lithium, or potassium salt composition is selected from dipotassium ethylenediamine tetraacetate or diammonium ethylenediamine tetraacetate, hydrates thereof, and mixtures thereof.

12. The method of claim 10 in which the pH of the aqueous mixture is from about 4 to about 12.

13. The method of claim 10 in which the pH of the aqueous mixture is from about 4 to about 6.

14. The method of claim 6 in which the ammonium, lithium, or potassium salt composition of an aminopolycarboxylic acid is selected from potassium ethylenediamine tetraacetate, ammonium ethylenediamine tetraacetate, potassium diethylenetriamine pentaacetate, ammonium diethylenetriamine pentaacetate, hydrates thereof, and mixtures thereof.

15. The method of claim 1 wherein the aqueous mixture further comprises a non-interfering component.

16. The method of claim 15 wherein the non-interfering component is a pH-adjuster.

17. The method of claim 1 wherein the aqueous liquid is fresh water, brine or dilute acids.

18. The method of claim 1 wherein the aqueous mixture comprises from about 5 to about 50 weight percent of the aminopolycarboxylic anionic species.

19. The method of claim 1 wherein the formation temperature ranges from about 13° C. to about 205° C.

20. The method of claim 1 wherein a preflush fluid is injected prior to injection of the aqueous mixture.

21. The method of claim 1 wherein a pumping rate and a pH of the aqueous mixture and a composition of the aqueous mixture are selected in combination based on the solubility of and reactivity of an aminopolycarboxylic anionic species, in the aqueous mixture, selected from EDTA anion, DTPA anion, and mixtures thereof, and a cationic species, in the aqueous mixture, selected from potassium ion, lithium ion, ammonium ion, and mixtures thereof, whereby the volume of the aqueous mixture required to create wormholes is minimized.

22. The method of claim 1 wherein a pH of the aqueous mixture and an aminopolycarboxylic anionic species component, of the aqueous mixture, selected from EDTA anion, DTPA anion, and mixtures thereof, and a cationic species component, of the aqueous mixture, selected from potassium ion, lithium ion, ammonium ion, and mixtures thereof, are selected in combination, whereby the pumping rate of the aqueous mixture required to create wormholes is minimized.

23. The method of claim 18 wherein the aqueous mixture comprises from about 5 to about 20 weight percent of the aminopolycarboxylic anionic species.

* * * * *